United States Patent [19]

Loratto

[11] 4,327,787

[45] May 4, 1982

[54] LOG SPLITTING ASSEMBLY

[76] Inventor: Robert J. Loratto, 7010 Locust Ct., Owens, Md. 20836

[21] Appl. No.: 111,214

[22] Filed: Jan. 11, 1980

[51] Int. Cl.³ ............................................. B27L 7/00
[52] U.S. Cl. ............................ 144/193 C; 144/193 D; 173/91; 254/104
[58] Field of Search .................... 173/89, 90, 91; 144/193 R, 193 C, 193 D; 254/104

[56] References Cited

U.S. PATENT DOCUMENTS

| | | | |
|---|---|---|---|
| 224,578 | 2/1880 | Carpenter | 119/514 |
| 759,868 | 5/1904 | Eich | 254/104 |
| 1,356,413 | 10/1920 | Staub | 254/104 |
| 1,521,265 | 12/1924 | Anderson | 173/91 X |
| 2,742,266 | 4/1956 | Voelkerding | 173/91 X |
| 3,050,095 | 8/1962 | Prather | 144/193 D |
| 3,143,817 | 8/1964 | Paulson | 173/90 |
| 3,381,763 | 5/1968 | Matson | 144/193 C X |
| 3,519,087 | 7/1970 | Santi | 144/193 C X |
| 3,735,822 | 5/1973 | Deike | 144/193 C X |
| 4,175,601 | 11/1979 | Meyer | 254/104 |
| 4,254,808 | 3/1981 | Nokes | 144/193 R |

FOREIGN PATENT DOCUMENTS

| | | | |
|---|---|---|---|
| 206736 | 7/1955 | Australia | 173/90 |
| 1923349 | 11/1970 | Fed. Rep. of Germany | 254/104 |

*Primary Examiner*—W. D. Bray
*Attorney, Agent, or Firm*—Schwartz, Jeffery, Schwaab, Mack, Blumenthal & Koch

[57] ABSTRACT

A log splitting assembly comprising a pipe having a wedge at the bottom, a driving sleeve which telescopes around the pipe, and a plurality of weights positioned at the top of the driving sleeve around a post. The weights can be selected and interchanged so as to provide a total weight which accommodates the ability of the user to lift the sleeve and weights and subsequently drop the same with force. The log can thus be split in the most efficient manner.

5 Claims, 4 Drawing Figures

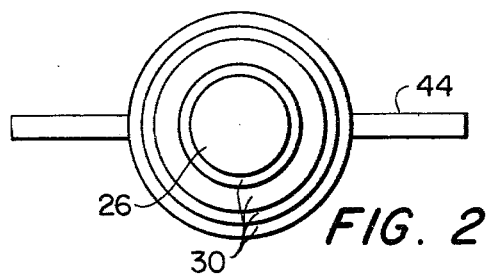
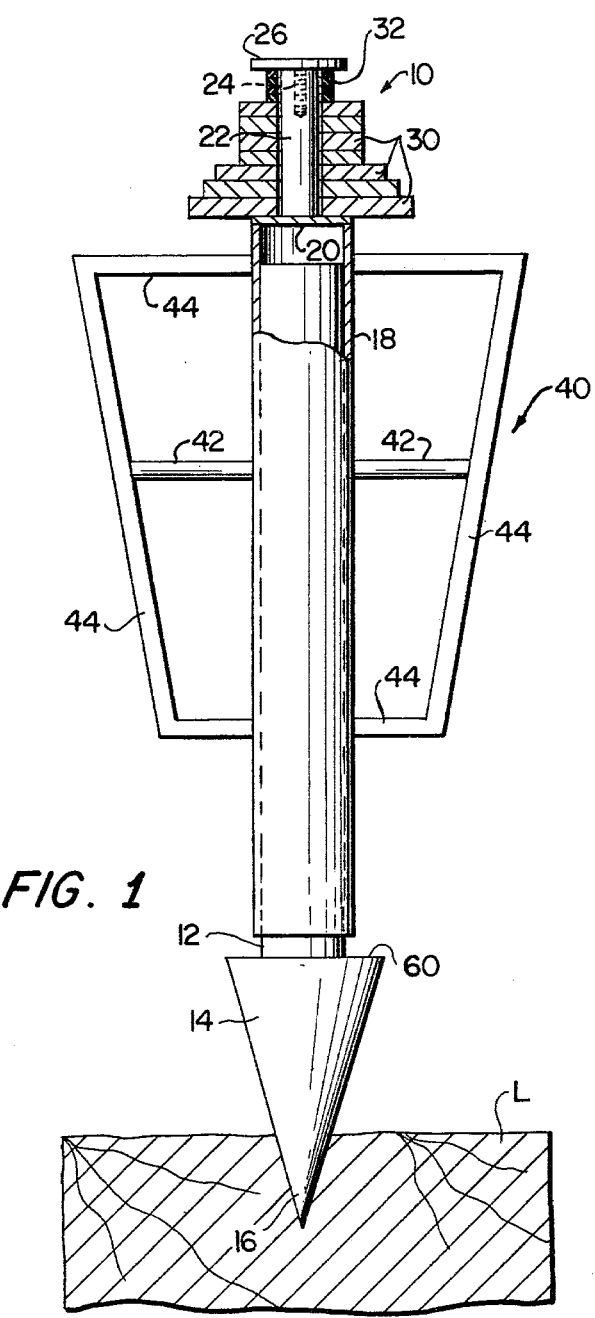
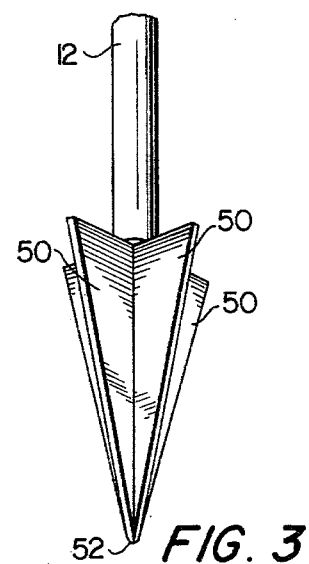
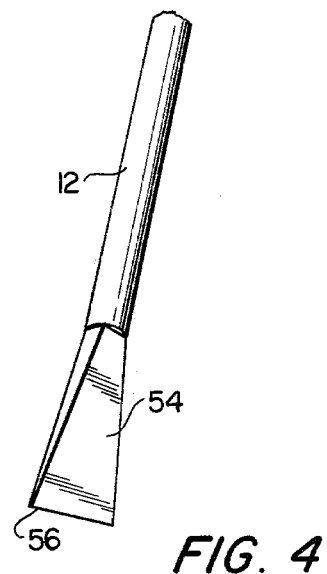

LOG SPLITTING ASSEMBLY

BACKGROUND OF THE INVENTION

The present invention relates as indicated to a log splitting assembly, and relates more particularly to an assembly comprising a pipe having a wedge of varying shape secured to the bottom thereof, and a driving sleeve telescopically mounted over the pipe and adapted to drivingly engage the wedge for forceably splitting the log into which the wedge extends. To augment the driving force, the upper end of the driving sleeve is constructed and arranged to receive a plurality of weights which, upon dropping downwardly with the driving sleeve, are able to apply a substantially greater force on the wedge for log splitting purposes.

Perhaps the most common method of splitting logs is through the use of an ax which penetrates the exposed end of the log to increasingly greater depths until the log can be split. This common expedient has several obvious disadvantages. First, it is physically exhausting. Secondly, this method for practical purposes is limited to logs of a particular diameter. Still further, the ax must be removed from the wood prior to the next stroke, which requires a great deal of precision in striking the log in the wedge already produced in the log. This difficulty is magnified in the event the log is not supported in some manner to avoid lateral shifting when struck.

A second common method of splitting logs is the use of a separate wedge which is held by a hand of the user and started in the log by a sledge hammer held in the other hand. This method also has obvious disadvantages, principally the difficulty of continually hitting the wedge squarely by the hammer, and the limitation of penetration of the wedge based on the length thereof. If the wedge is driven below the surface of the log and the log remains unsplit, it is difficult to dislodge the wedge.

The present invention is, in a broad sense, an impact tool, and tools of that general type are known in the art. For example, U.S. Pat. No. 224,578 to Carpenter discloses a sledge having a hollow handle which is adapted to fit over a fence post, with the sledge when so positioned functioning to tap the fence post sufficiently into the ground so that it is stabilized. The sledge can then be removed from the fence post and used in its normal manner. In Carpenter, however, a single weight must necessarily be provided, which constitutes the sledge head.

U.S. Pat. No. 3,050,095 to Prather discloses a bar or pike used to remove tree stumps, with the bar being formed at its lower end with a point adapted to penetrate into the stump. A hammer is slidably mounted on the bar and, when lowered, is adapted to contact a collar for transmitting force downwardly through the bar and the point. The assembly is particularly designed for drilling a bore or hole in a stump so that an explosive charge can be placed therein for destroying the stumps. Prather does not provide an assembly of weights detachably mounted on a driving sleeve as in accordance with the present invention.

A still further form of impact tool is disclosed in U.S. Pat. No. 3,519,087 to Santi. Although Santi does disclose a plurality of weights mounted at the top of the shaft of a striker assembly, the overall structure of Santi is significantly different than the present invention. Moreover, the impact tool of Santi required changing of the tool at the end, which obviously limits or precludes the use of the Santi tool in a log splitting environment since the tool could not be changed if it becomes struck in the log. Even if successfully removed, the splitting operation would have to essentially start over.

SUMMARY OF THE PRESENT INVENTION

The present invention is particularly characterized by a pipe secured to the lower end of which is a wedge or point, a driving sleeve which telescopically fits over the pipe, and a series of weights removably attached at the upper end of the driving sleeve to provide a greater force when the driving sleeve is moved downwardly. In accordance with the invention the point or wedge engages and penetrates the top surface of the log, and by repeated downward blows from the driving sleeve, the point or wedge is made to penetrate sufficiently far into the log to cause a splitting thereof. Before each downward blow of the driving sleeve, the same is moved upwardly and then rapidly downwardly to apply force to the pipe or to the wedge or point, or both.

An important feature of the invention resides in the adaptability of the assembly to a condition most efficient for a particular user of the assembly. The weights removably attached at the top of the driving sleeve can be adjusted as desired with regard to total weight whereby the assembly can be adjusted to accommodate most efficiently the capability of the user to handle the assembly. Thus, for individuals who are relatively strong, the weight total can be significantly higher thereby providing greater impact force for each blow delivered by the driving sleeve to the pipe. For relatively smaller individuals, the weight total can be selected at a substantially lower level. The criterion for weight selection is the total weight which the user can easily manage to lift after each blow and then move rapidly downwardly to deliver the subsequent blow. Varying sizes of weights are provided with the assembly so that the most efficient selection can be made.

Another feature of the invention is the ability to use the same with little or no previous experience or skill being necessary. The invention is such that the wedge is accurately and continually struck when the driving sleeve is reciprocated. Moreover, due to the length of the pipe, the wedge can be continually driven until the wedge is through or has split the log. The steady application of force to the wedge, due to the weights and driving sleeve, cannot be applied by presently known log splitting techniques.

A further feature of the invention is the provision of a handle formed on the driving sleeve by means of which the sleeve can be more easily manipulated upwardly and downwardly. The handle serves not only to provide hand-engaging portions but also serves to rigidify the driving sleeve.

At still further feature of the invention is the manner in which the weights are attached to the upper part of the driving sleeve. A sleeve cap extends over the top of the sleeve, and a post is rigidly secured to the cap. The weights are adapted to extend over the post, with the bottommost weight resting on the sleeve cap. The upper end of the post is internally threaded to receive the threaded shank of a locking cap, with one or more rubber washers being positioned between the locking cap and the uppermost weight. In this manner, the locking cap can be firmly tightened to the post, with the rubber washers resiliently biasing the weights into engagement with the sleeve cap. To remove the weights from the post so as to permit different size weights to be positioned around the post, the locking cap is unthreaded and removed along with the washer or washers whereby the weights can be lifted from around the post and different weights reassembled around the post for subsequent resilient retention by the locking cap and washers.

Yet another object of the invention is to permit one driving sleeve to be replaced by another if desired. If the wedge should become stuck, the second sleeve can be used to either free the wedge or to finish the splitting operation.

Other objects of the invention will become apparent as the following description proceeds in particular reference to the application drawings.

BRIEF DESCRIPTION OF THE APPLICATION DRAWINGS

FIG. 1 is a side elevational view, partly in section, showing the log splitting assembly of the present invention, with the pipe carrying a wedge point at the bottom thereof, shown partially penetrating the log;

FIG. 2 is a top plan view of FIG. 1;

FIG. 3 is a bottom perspective view showing a wedge of different shape, and

FIG. 4 is a bottom perspective view showing a further wedge form.

DETAILED DESCRIPTION OF THE PREFERRED EMBODIMENTS

Referring now in detail to the application drawing, wherein like parts are indicated by like reference numerals, the log splitting assembly is generally indicated at 10 and includes a pipe 12 to the bottom of which is rigidly secured a wedge 14. In FIG. 1 the wedge is conical, tapering to a point 16, which has partially penetrated the top surface of the log L.

The assembly further includes a driving sleeve 18 which is tubular in construction and of a diameter so as to relatively tightly telescope over the pipe 12. A cap 20 is fixed to the top of the sleeve 18 by means of welding or the like. A post 22 is welded or otherwise secured to the top of the cap 20 and is positioned generally centrally with regard to the cap. The post 22 is preferably solid, and is tapped centrally at the upper end thereof so as to threadedly receive the shank 24 of a locking cap 26. Although the shape of the cap is not critical to the invention, in the form shown the cap is circular and of a diameter greater than the diameter of the post 22.

A plurality of weights commonly designated at 30 have central holes or openings whereby they may be slipped over the post 22 as shown in FIG. 1. It is preferred that a wide array of weights be provided with the assembly so as to permit the total weight provided by the assembly of weights to be selected so as to most efficiently accommodate the manipulation of the assembly by the user. As shown, the bottommost weights 30 are diametrically enlarged and of greater weight than the uppermost weights, although the weights can be mixed as desired to accomplish the intended result. Weights of the type generally used in body building exercises have proved very satisfactory in use.

A washer 32 having a diameter slightly larger than the diameter of the post 22 is adapted to extend over the latter and is interposed between the bottom surface of the locking cap 26 and the upper surface of the uppermost weight 30. During assembly, the weights 30 are positioned over the post and the washer 32 placed over the uppermost weight. The washer is formed of a resiliently deformable material, such are rubber, whereby the same can be compressed when the locking cap 20 is positioned and tightened by threading the shank 24 thereof into the threaded opening formed at the upper end of the post. In this manner the weights are resiliently biased downwardly, with the bottom surface of the bottom weight 30 being in firm engagement with the top surface of the cap 20. It will be seen that the weights 30 can be changed as desired simply by removing the locking cap and washer and substituting the desired weights for those weights previously used. A plurality of washers may alternatively be used, and serve as spacers when fewer weights are used.

A handle assembly generally indicated at 40 is attached to the driving sleeve, with the handle assembly including handle members commonly designated at 42, and a frame comprised of individual frame sections commonly indicated at 44 which are connected to form the assembly shown. The uppermost frame members 44 are secured by welding or the like to the driving sleeve, as are the lowermost members 44. The handle members 42 are secured by welding to the driving sleeve and at their outer ends to the members 44. The members 44 can be formed of any suitable material and can be of any shape, with pipe sections or the like being entirely satisfactory. The handle assembly 40 functions to provide not only handles 42 by means of which the entire assembly can be grasped, but also provides reinforcing of the driving sleeve.

FIG. 3 illustrates a different shape wedge, with four identical wedge sections commonly designated at 50 being provided, spaced 90° apart. Each wedge section is generally triangular shape as shown, tapering to a point 52. The advantage of the FIG. 3 form of wedge is that upon penetration of the wedge into the log, four separate cuts are made in the log, at 90° apart. This tends to split the log into four parts.

FIG. 4 shows a still further form of wedge, comprising a wedge blade 54, which becomes increasingly greater in width but thinner in cross-section toward the bottom thereof, which terminates in a generally sharp surface 56. The use of the FIG. 4 wedge form normally results in the log being split essentially in half, which may be desired for logs of a particular diameter.

The use of the log splitting assembly of the present invention should be apparent from the above description. After the weights have been assembled and tightened in place, the user grips the handles 42 and moves the entire assembly downwardly into the log so that the point 16, as shown in FIG. 1, penetrates the log L. The driving sleeve 18 is then moved upwardly by the handles 42, and subsequently dropped with force. As the driving sleeve drops, the bottom of the sleeve engages the top shoulder 60 of the wedge 14 so as to transmit force directly to the wedge. It will be apparent that the length of the driving sleeve can be selected so that the cap 20 of the driving sleeve engages the top of the pipe 12 to effect the driving, or the cap 20 and the bottom of the sleeve can make contact simultaneously thereby transmitting force directly to both the top of the pipe and the shoulder 60 of the wedge.

The different types of wedge tools are normally provided at the site, and one selected most appropriate for the size of the logs to be split. Likewise a variety of weights are at the site, and can be assembled as desired.

I claim:

1. A log splitting assembly comprising:

(a) elongated means mounted on the bottom end of which is a wedge adapted to be forced into a log or the like for splitting the same,
(b) an elongated driving sleeve having a diameter so as to telescopically slide over said elongated means to permit vertical reciprocation of said sleeve relative to said elongated means, said driving sleeve having a sleeve cap secured to the top thereof,
(c) post means secured to said sleeve cap and extending upwardly therefrom, said post means having a threaded opening formed in the upper end thereof,
(d) a plurality of weights disposed around said post means, with the bottommost weight resting on said cap sleeve,
(e) means for detachably retaining said weights on said post means, comprising a locking cap having a threaded shank engageable with said threadable opening in said post means and a resiliently compressible washer interposed between said locking cap and the uppermost of said plurality of weights; and
(f) a handle assembly secured to said driving sleeve below said sleeve cap, said handle assembly comprising a plurality of frame sections secured to each other and to said driving sleeve to provide a frame, and a pair of handles positioned on either side of said driving sleeve and secured thereto and to said frame to facilitate movement of said driving sleeve during use;
whereby weights can be selected as desired to vary the total weight to best accommodate the ability of the user of the assembly to vertically reciprocate the driving sleeve and weights, thereby most efficiently effecting splitting of the log.

2. The assembly of claim 1 wherein said wedge mounted on the bottom of said elongated means comprises a wedge generally conical shaped and tapering to a point to facilitate entry thereof into the log to be split.

3. The assembly of claim 1 wherein said wedge mounted on the bottom of said elongated means comprises a wedge formed of four separate wedge sections substantially equally spaced from each other, each of said wedge sections being generally triangular in elevation and tapering to a point at the bottom thereof.

4. The assembly of claim 1 wherein said wedge mounted on the bottom of said elongated means is generally blade-shaped, increasing in width and decreasing in thickness toward the bottom thereof, thereby to provide a sharp contact line for entering the log to be split.

5. The assembly of claim 1 wherein said elongated means comprises a pipe, and said wedge is rigidly secured to the bottom of said pipe.

* * * * *